US006216500B1

(12) United States Patent
Kang

(10) Patent No.: US 6,216,500 B1
(45) Date of Patent: Apr. 17, 2001

(54) DEVICE FOR UNLOCKING TUBULAR-TYPE DOOR LOCK IN CONJUNCTION WITH INDOOR HANDLE

(75) Inventor: Eui Shik Kang, Daegu (KR)

(73) Assignee: Hyundai Metal Co., Ltd., Daegu (KR)

( * ) Notice: Subject to any disclaimer, the term of this patent is extended or adjusted under 35 U.S.C. 154(b) by 0 days.

(21) Appl. No.: 09/366,074

(22) Filed: Aug. 2, 1999

(51) Int. Cl.[7] .................................................... B60R 25/02

(52) U.S. Cl. .......................... 70/224; 70/223; 292/336.3; 292/357

(58) Field of Search ................................ 292/336.3, 348, 292/357; 70/221–224, 215–218, 467, 472

(56) References Cited

U.S. PATENT DOCUMENTS 5,157,952 * 10/1992 Lin .................................... 70/224 X
5,157,953 * 10/1992 Hung ..................................... 70/224
5,177,987 * 1/1993 Shen ...................................... 70/224
5,301,526 * 4/1994 Fann et al. ............................ 70/224
5,598,726 * 2/1997 Cordle ................................... 70/224
5,657,653 * 8/1997 Hensley et al. ........................ 70/224
5,784,909 * 7/1998 Huang ................................... 70/224
5,816,086 * 10/1998 Russell, IV ........................ 70/223 X
5,868,018 * 2/1999 Kang ................................. 70/223 X
5,916,281 * 6/1999 Kester et al. ...................... 70/472 X
5,934,117 * 8/1999 Shen .................................. 70/223 X
5,941,108 * 8/1999 Shen .................................. 70/224 X
6,021,654 * 2/2000 McCaa .............................. 70/223 X

* cited by examiner

*Primary Examiner*—Suzanne Dino Barrett
(74) *Attorney, Agent, or Firm*—Jacobson, Price, Holman & Stern, PLLC

(57) ABSTRACT

A device for unlocking a tubular-type door lock in conjunction with the indoor handle is disclosed. A hollow shaft is fitted into the outdoor plate, while a hollow sleeve is axially received in the hollow shaft to be movable in opposite directions. The sleeve is normally and rotatably positioned in the opening of the outdoor plate to be unlocked, but selectively engages with the locking slot of the outdoor plate to be locked. A ratchet unit, consisting of locking and unlocking ratchets, is received in the sleeve, thus being operable in conjunction with the indoor handle to selectively move the sleeve. The two ratchets, individually having a ratchet face, engage with each other at their ratchet faces to be relatively slidable on their slope surfaces in conjunction with the indoor handle, thus selectively and axially moving the sleeve from the locked to the unlocked position.

6 Claims, 7 Drawing Sheets

DEVICE FOR UNLOCKING TUBULAR-TYPE DOOR LOCK IN CONJUNCTION WITH INDOOR HANDLE

BACKGROUND OF THE INVENTION

1. Field of the Invention

The present invention relates, in general, to tubular-type door locks with indoor and outdoor handles and, more particularly, to a device for unlocking such a tubular-type door lock in conjunction with the indoor handle, the unlocking device quickly and simultaneously performing both a door latch opening action and an unlocking action in conjunction with a rotating motion of the indoor handle, thus allowing a user to easily and quickly open a door by rotating the indoor handle without separately unlocking the lock.

2. Description of the Prior Art

As well known to those skilled in the art, door locks are typically classified into two types: cylinder-type locks and tubular-type locks. The typical cylinder-type door locks are designed as follows. That is, when the indoor locking button of a cylinder-type lock is pressed to lock the door, it is impossible to operate the outdoor handle without using a key. Therefore, the lock with the pressed indoor locking button cannot be unlocked outside the door if a user does not use a key. However, in such a case, the indoor handle is rotatable, so that a user can unlock and open the door by rotating the indoor handle.

Meanwhile, tubular-type door locks are designed so that when the lock is locked by rotating an indoor locking lever, neither the indoor handle nor the outdoor handle of the lock can be operated if a user does not use a key. Therefore, when it is necessary for a user to open a door with a tubular-type door lock being locked by the locking lever, the user has to unlock the door lock prior to operating the indoor handle. The tubular-type door locks are thus inconvenient to users.

In order to overcome the above-mentioned problems, a tubular-type door lock with a somewhat improved structure is proposed. The above lock is designed as follows. That is, when the lock is locked by rotating an indoor locking lever, the indoor handle is operable with the locked state of the lock being maintained, while the outdoor handle is not operable if a user does not use a key. Since the locked state of the lock is maintained even though the indoor handle is operated by a user, such locks sometimes render users puzzled. That is, some users may open the door by rotating the indoor handle and go out of a room without unlocking the locking lever or having the key of the lock. In such a case, the door lock cannot be unlocked outside the door, thus forcing the user to send for a locksmith while paving charges for such services. It is thus necessary for users, wanting to be free from such mistaken conditions, to always confirm the locked or unlocked position of the locking lever at a time he goes out of a room and this is an inconvenience to the users.

SUMMARY OF THE INVENTION

Accordingly, the present invention has been made keeping in mind the above problems occurring in the prior art, and an object of the present invention is to provide a device for unlocking a tubular-type door lock in conjunction with the indoor handle of the lock, said device quickly and simultaneously performing both a door latch opening action and an unlocking action in conjunction with a rotating motion of the indoor handle, thus allowing a user to easily and quickly open a door by rotating the indoor handle without separately unlocking the locking lever.

In order to accomplish the above object, the present Invention provides a device for unlocking a tubular-type door lock in conjunction with an indoor handle of the lock, comprising: a holed outdoor plate coupled to an outdoor handle of the door lock, the plate having a locking slot and defining an opening at a position outside the locking slot; a hollow shaft fitted into the holed outdoor plate; a bearing fixedly seated in the hollow shaft at a predetermined position; a hollow sleeve axially received in the hollow shaft to be movable in opposite directions and normally biased by a first spring in a direction toward the indoor handle, the sleeve thus being normally and rotatably positioned in the opening of the outdoor plate to be unlocked, but selectively engaging with the locking slot of the outdoor plate to be locked by the outdoor plate; a ratchet unit received in the hollow sleeve while being normally biased in a direction toward the indoor handle, the ratchet unit being operable in conjunction with the indoor handle, thus moving the sleeve from a locked position into an unlocked position, the ratchet unit comprising: an unlocking ratchet positioned in the sleeve at a position toward the indoor handle, the unlocking ratchet having a first ratchet face consisting of first top and bottom surfaces with a first slope surface extending between the top and bottom surfaces; and a locking ratchet positioned in the sleeve at a position toward the outdoor handle while being normally biased in the direction toward the indoor handle, the locking ratchet having a second ratchet face consisting of second top and bottom surfaces with a second slope surface extending between the second top and bottom surfaces, the locking ratchet engaging with the unlocking ratchet at their ratchet faces to be relatively slidable on the slope surfaces in conjunction with the indoor handle, thus being selectively movable in an axial direction to move the sleeve from the locked position into the unlocked position of the sleeve.

BRIEF DESCRIPTION OF THE DRAWINGS

The above and other objects, features and other advantages of the present invention will be more clearly understood from the following detailed description taken in conjunction with the accompanying drawings, in which:

FIGS. 3*a* and 3*b* are sectional views of the device of FIG. 2 after the parts of the device are assembled into a single body, in which:

FIG. 3*a* shows the device in a normal position; and

FIG. 3*b* shows the device in a locked position;

FIGS. 4*a* and 4*b* are views showing the above device in the normal position, in which:

FIG. 4*a* is a partially sectioned side view of the device; and

FIG. 4*b* is a cross-sectioned view of the device taken along the line A–A' of FIG. 4*a;*

FIGS. 5*a* and 5*b* are views showing the above device in the locked position, in which:

FIG. 5*a* is a partially sectioned side view of the device; and

FIG. 5*b* is a cross-sectioned view of the device taken along the line B–B' of FIG. 5*a;*

FIGS. 6*a* and 6*b* are views showing the operation of the device of FIGS. 5*a* and 5*b* with the indoor handle of the lock being rotated counterclockwise in the drawings, in which:

FIG. 6*a* is a partially sectioned side view of the device; and

FIG. 6*b* is a cross-sectioned view of the device taken along the line C–C' of FIG. 6*a;*

FIGS. 7*a* and 7*b* are views showing the operation of the device of FIGS. 5*a* and 5*b* with the indoor handle of the lock being rotated clockwise in the drawings, in which:

FIG. 7*a* is a partially sectioned side view of the device; and

FIG. 7*b* is a cross-sectioned view of the device taken along the line D–D' of FIG. 7*a;*

DESCRIPTION OF THE PREFERRED EMBODIMENTS

Figure 1:
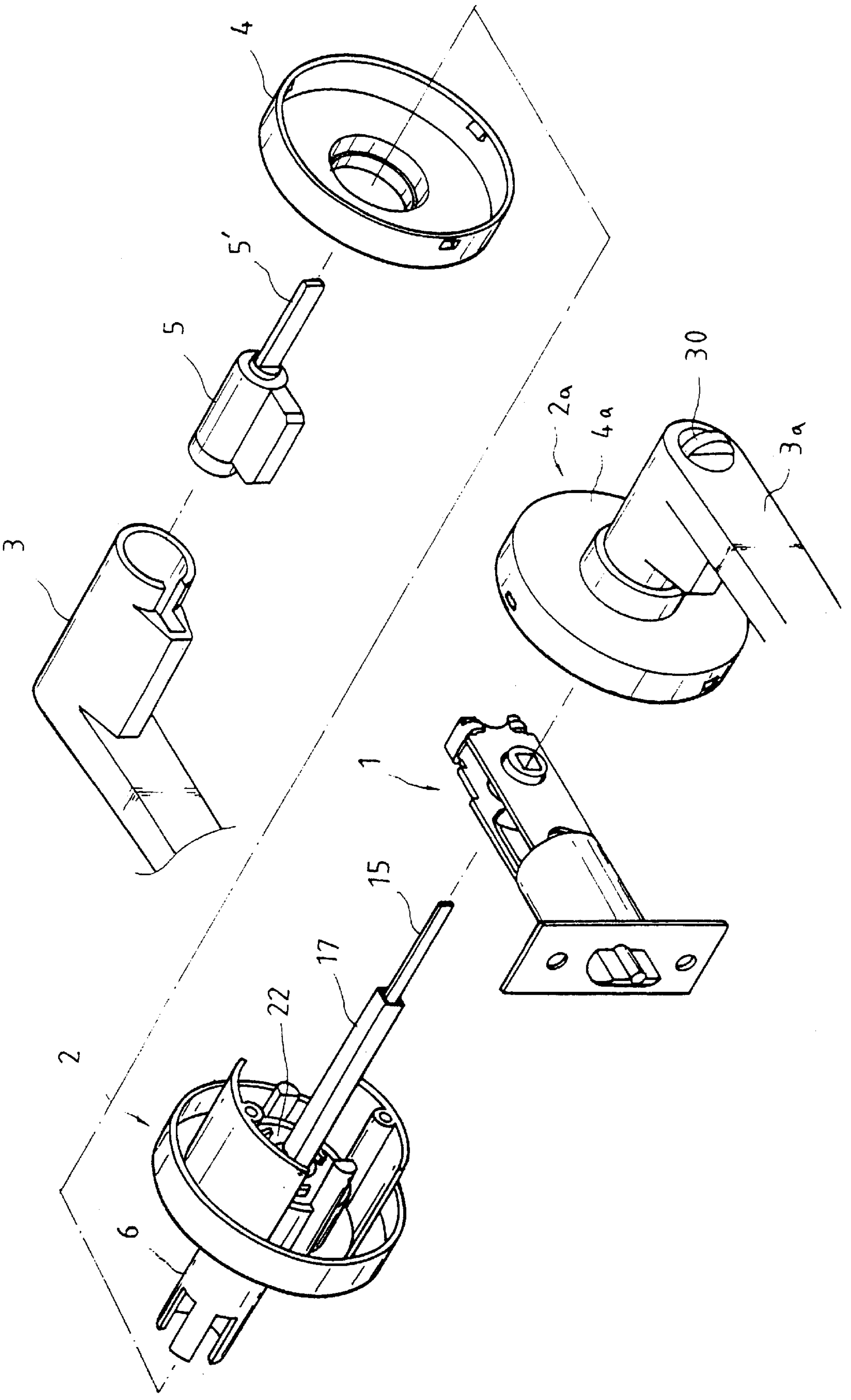
FIG. 1 is an exploded perspective view of a tubular-type door lock in accordance with the present invention.

FIG. 1 is an exploded perspective view showing the total construction of a tubular-type door lock in accordance with this invention. As shown in the drawing, the door lock of this invention comprises two plates: an indoor plate 2*a* and an outdoor plate 2 with a latch bolt 1 being interposed between the two plates 2 and 2*a*. Two handles or indoor and outdoor handles 3*a* and 3 are coupled to the indoor and outdoor plates 2*a* and 2, respectively. Of course, the technical term "indoor" means that the concerned parts are positioned on the inside face of a door, while the term "outdoor" means that the concerned parts are positioned on the outside face of the door. In the drawing, the reference numerals 4 and 4*a* denote plate covers for the two plates 2 and 2*a*, while the numeral 5 denotes a key housing.

Figure 2:
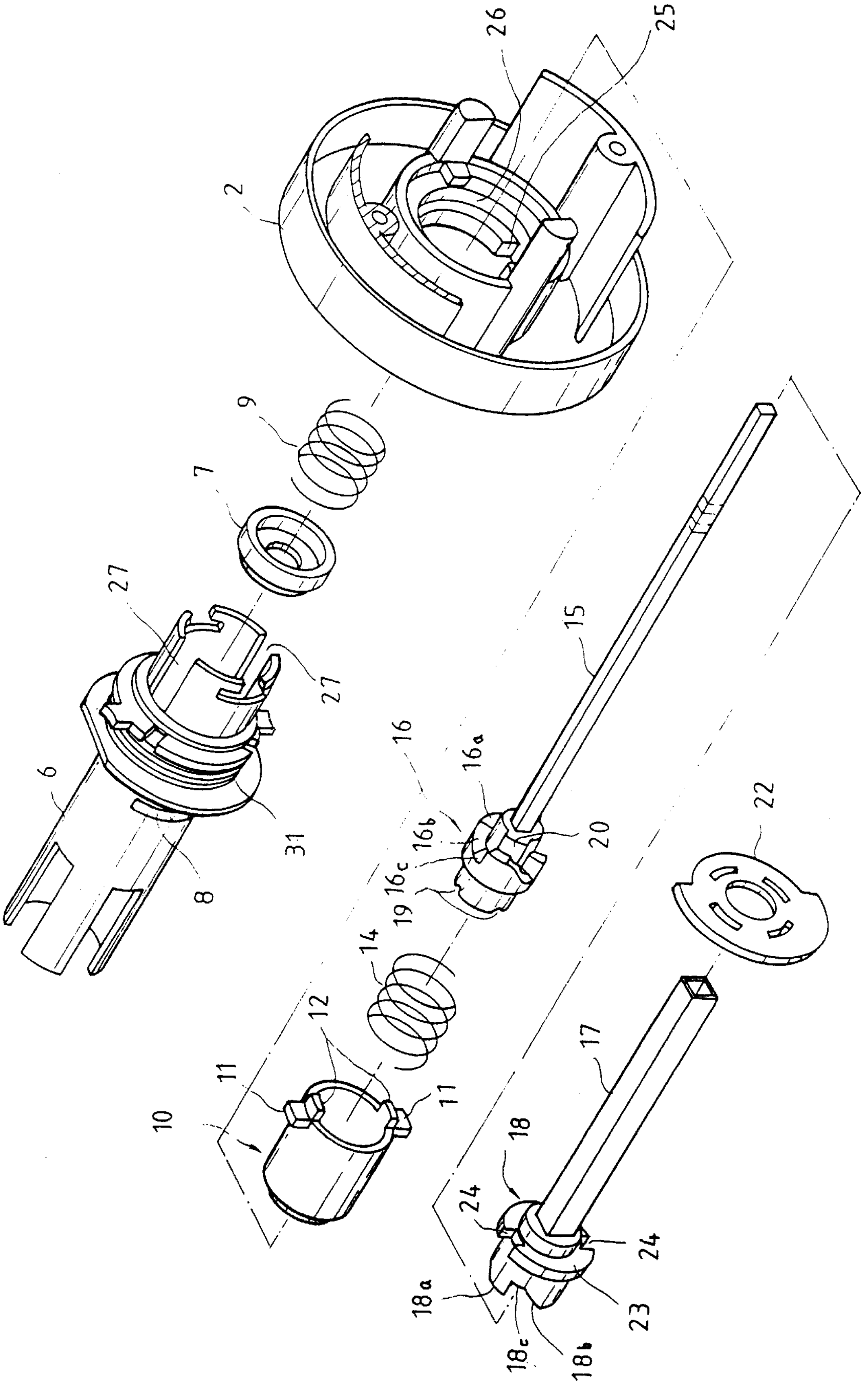
FIG. 2 is an exploded perspective view showing the construction of a device for unlocking the tubular-type door lock in conjunction with the indoor handle in accordance with the preferred embodiment of the present invention.

FIG. 2 shows the construction of a device for unlocking the above door lock in conjunction with the indoor handle 3*a* in accordance with the preferred embodiment of this invention. As shown in the drawing, the device comprises a hollow shaft 6 to which both the outdoor plate 2 and the outdoor handle 3 are commonly coupled. The device also has a plurality of assistant parts, which are to be assembled with the shaft 6 as will be described hereinbelow. In order to assemble the shaft 6 with the plate 2 and handle 3, the shaft 6 is primarily inserted into the outdoor plate 2 with one end of the shaft 6 projecting from the inside surface of the plate 2 to a length. Thereafter, the above assistant parts are set in the hollow shaft 6 from the in side of the plate 2.

Figure 9:
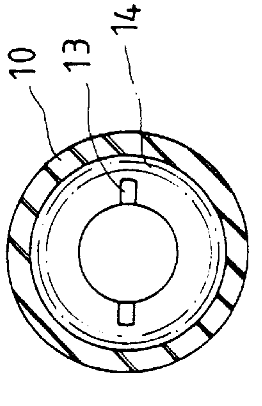
FIG. 9 is a cross-sectioned view of the device taken along the line E–E' of FIG. 6*a.*

An annular bearing 7, having a holed seat, is primarily set in the shaft 6. In such a case, the holed seat of the bearing 7 is brought into contact with an elastic support piece 8 of the shaft 6, so that the position of the bearing 7 in the hollow shaft 6 is fixed. Thereafter, a compression coil spring 9 is seated in the bearing 7 prior to inserting an actuating sleeve 10 into the shaft 6. The sleeve 10 is normally biased by the spring 9 in a direction opposite to the bearing 7. The above sleeve 10 has two types of projections 11 and 12. That is, a pair of first locking projections 11 are radially and outwardly formed on the end of the actuating sleeve 10 nearest the indoor handle at diametrically opposite positions. A pair of second locking projections 12 axially extended from said indoor end of the sleeve 10 at the same positions of the first projections 11. Two ratchet locking ribs 13 are radially formed on the inside surface of the sleeve's bottom at diametrically opposite positions as best seen in FIG. 9.

An actuating spring 14 is, thereafter, set in the sleeve 10 prior to inserting a ratchet unit, comprising two ratchets: locking and unlocking ratchets 16 and 18, into the hollow shaft 6. In such a case, the locking and unlocking ratchets 16 and 18 are integrated with locking and actuating shafts 15 and 17, respectively. Both ratchets 16 and 18 are hollowed. In addition, the locking shaft 15 of the ratchet 16 is a solid shaft, while the actuating shaft 17 of the ratchet 18 is a hollow shaft. The locking ratchet 16 is partially fitted into the unlocking ratchet 18 with the locking shaft 15 of the ratchet 16 axially passing through the hollow shaft 17 of the ratchet 18. The locking ratchet 16 has three teeth on one end face. Each of the above three teeth consists of a top surface 16*a* and a bottom surface 16*c* with a slope surface 16*b* extending between the two surfaces 16*a* and 16*c*. Four ratchet locking grooves 19 are radially formed on the other end face of the locking ratchet 16. The above grooves 19 are regularly spaced apart from each other at right angles. The above ratchet 16 also has two stop projections 20 on an axial boss formed on the toothed face. The two projections 20 are formed at diametrically opposite positions on the side wall of the boss and are perpendicular to the toothed face.

Figure 8:
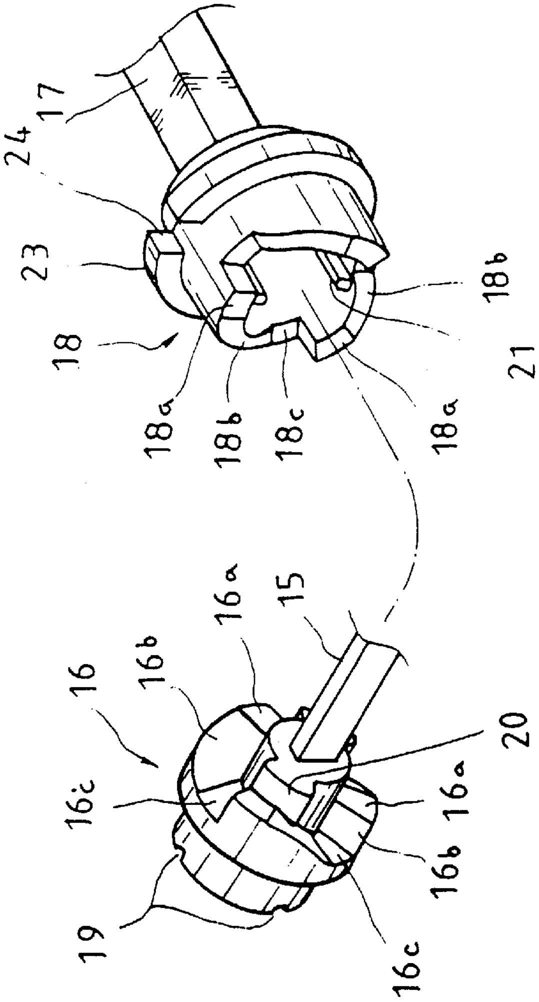
FIG. 8 is a perspective view showing a ratchet unit, comprising two ratchets: the locking ratchet and the unlocking ratchet, of the device according to this invention.

In the same manner as described for the locking ratchet 16, the hollow unlocking ratchet 18 has three teeth on one end face. Each of the above three teeth consists of a top surface 18*a* and a bottom surface 18*c* with a slope surface 18*b* extending between the two surfaces 18*a* and 18*c*. Two stop rails 21 are axially formed on the interior wall of the above hollow ratchet 18 at diametrically opposite positions as best seen in FIG. 8. A hoop 23 is formed on the outside wall of the above ratchet 18. The hoop 23 is notched at diametrically opposite two positions, thus forming two horizontal locking slots 24. The movable position of the two ratchets 16 and 18 in the hollow shaft 6 is limited by a stop plate 22 which is fixedly set in the outdoor plate 2.

The outdoor plate 2, holed at the center, has two, or "upper" and "lower" locking slots 25 and defines a circular opening 26 outside the slots 25. One end of the hollow shaft 6 is axially cut at top and bottom positions, thus forming top and bottom slits 27.

Figure 3A:
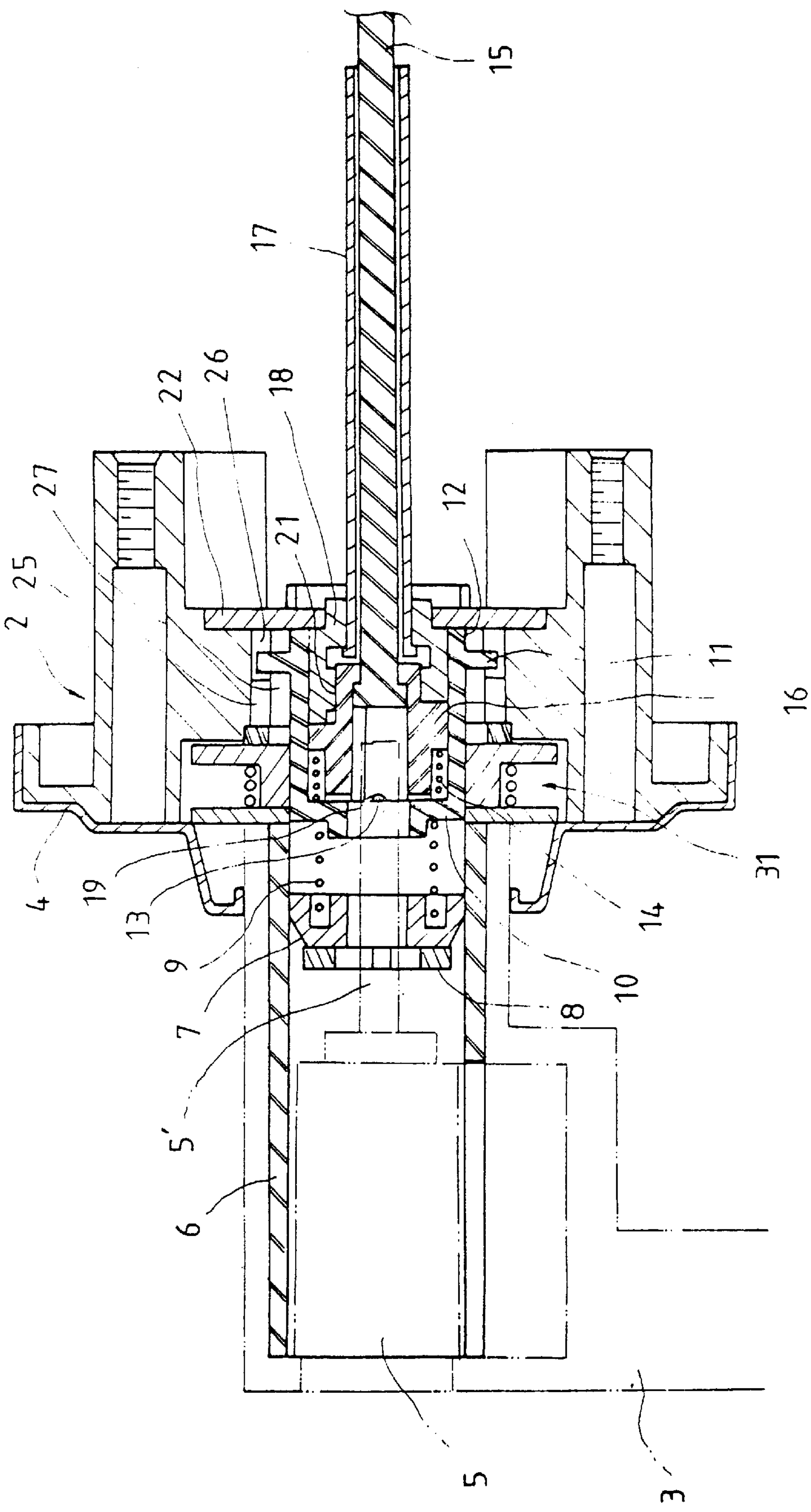
Figure 3B:
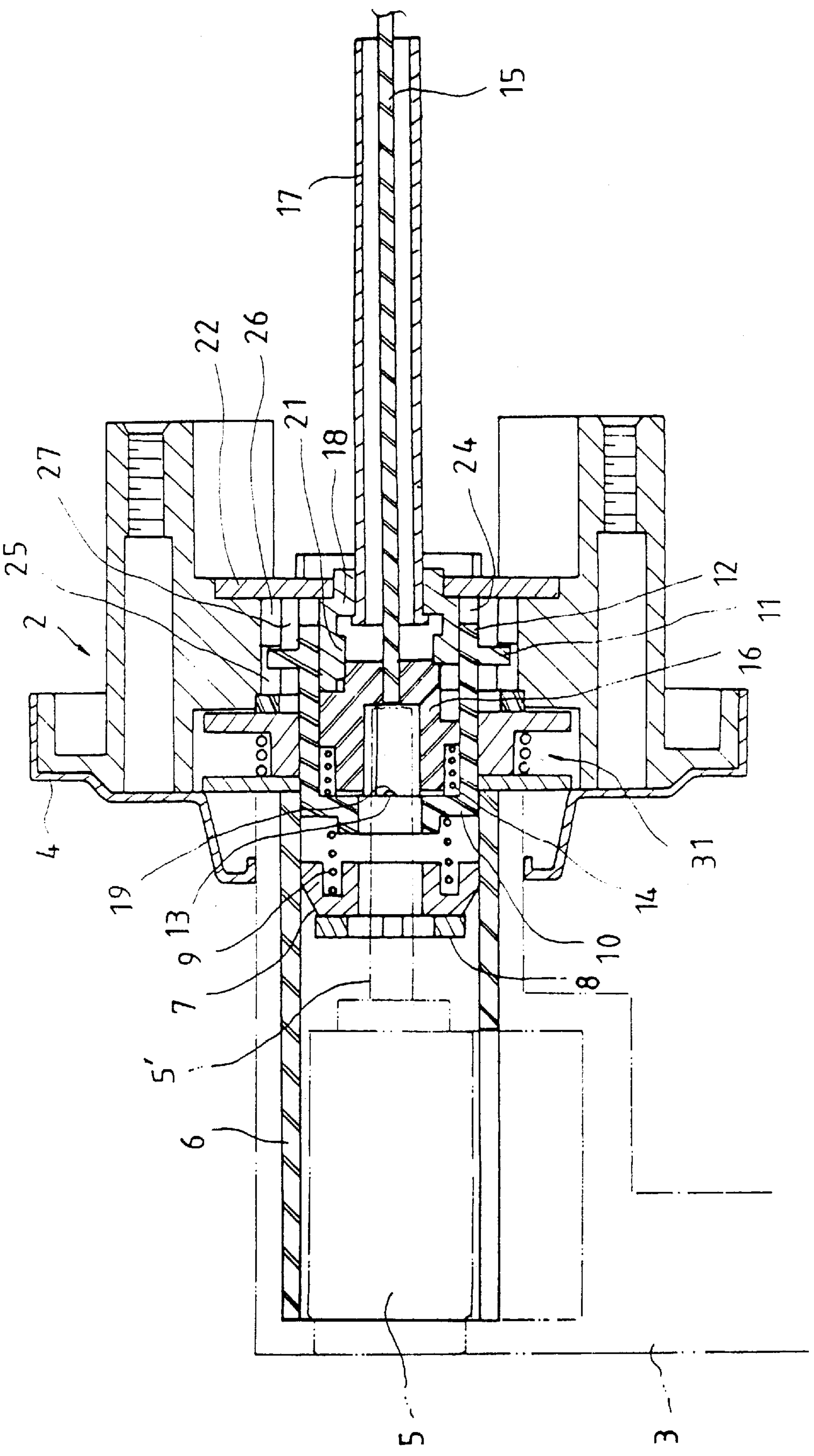

FIGS. 3*a* and 3*b* are sectional views of the device of FIG. 2 after the parts of the device are completely assembled into a single body. As shown in the drawings, the parts are regularly set in the hollow shaft 6 in the order of the bearing 7, the coil spring 9, the actuating sleeve 10, the actuating spring 14, the locking ratchet 16 and the unlocking ratchet 18 in a direction from the left to the right end of the shaft 6 in the drawings. At the side of the hollow shaft 6 opposite to the above parts, the key housing 5, having a locking shaft 5', is assembled with the shaft 6 along with the outdoor handle 3 in a way such that the locking shaft 5' is inserted into the center hole of the hollow locking ratchet 16. In a normal or unlocked position of the door lock, the first locking projections 11 of the actuating sleeve 10 are not positioned in the upper and lower locking slots 25, but are positioned in the opening 26 of the outdoor plate 2. In such a case, the second locking projections 12 of the sleeve 10 engage with the two horizontal locking slots 24 of the unlocking ratchet 18, respectively. In a locked position of the door lock, the first locking projections 11 are shifted from the opening 26 into the upper and lower locking slots 25.

In the drawings, the reference numeral 30 denotes a locking lever provided on the indoor handle 3*a*, while the numeral 31 denotes a means for automatically returning and balancing said lever 30.

Figures 4A, 4B, 5A, 5B:
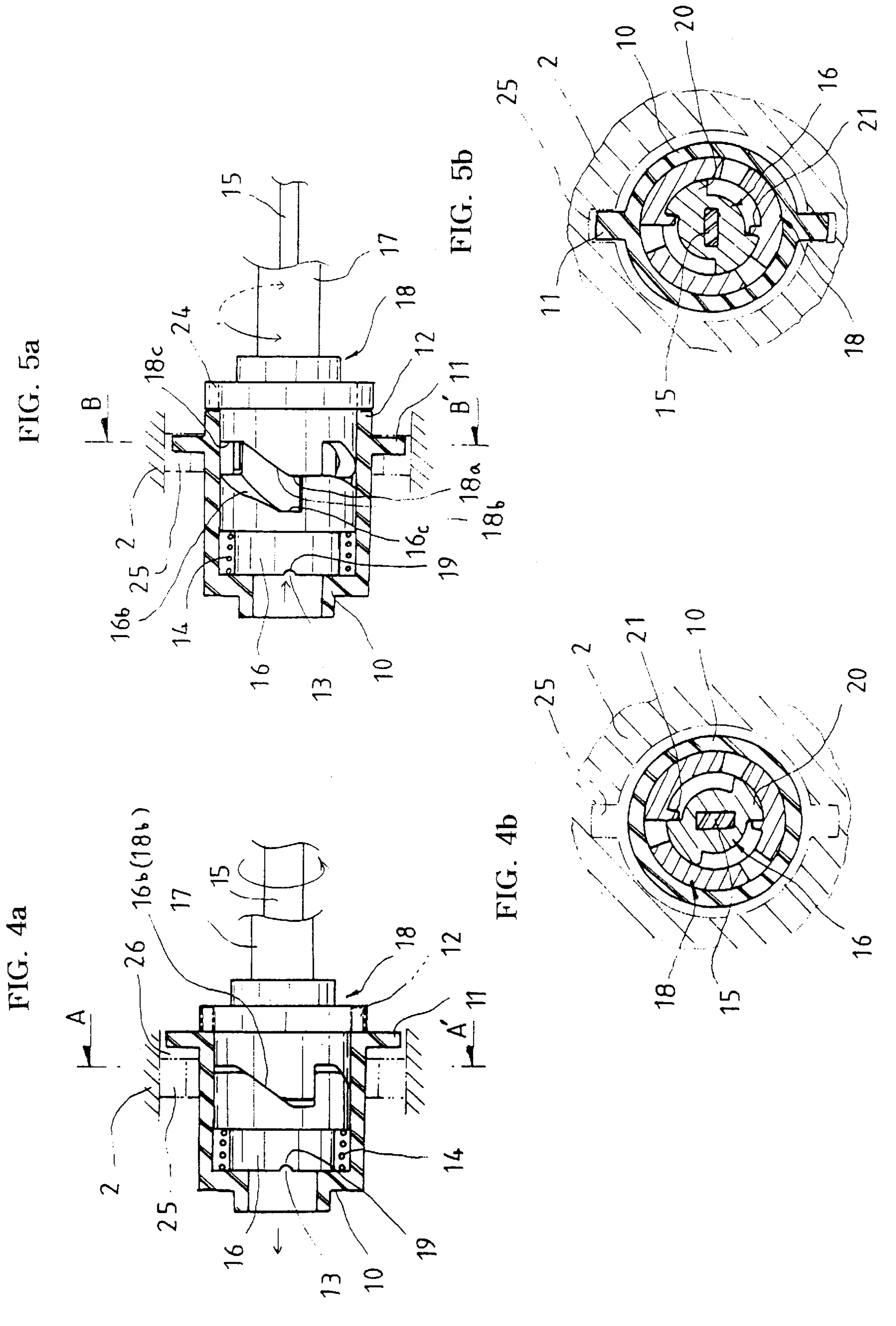

The latch bolt 1 of the tubular-type door lock of this invention is operated as follows. In a normal or unlocked position of the door lock, such as shown in FIGS. 3*a*, 4*a* and 4*b*, the outdoor handle 3 is rotatable by a user, thus operating the hollow shaft 6 engaging with the handle 3. When the handle 3 in such a normal unlocked position of the door lock is rotated, both the actuating sleeve 10 and the unlocking ratchet 18 are rotated so that the actuating shaft 17 operates the latch bolt 1. Such an operation of the door lock is due to the following positional relations between the parts of the lock as shown in FIGS. 1 and 2. That is, the first locking projections 11 of the sleeve 10, engaging with the top and bottom slits 27 of the hollow shaft 6, are positioned in the opening 26 of the outdoor plate 2, while the second locking projections 12 of said sleeve 10 engage with the two horizontal locking slots 24 of the unlocking ratchet 18. The sleeve 10 in such a normal position of the door lock is rotatable and this allows the outdoor handle 3 to be rotatable by a user without using a key.

Of course, the indoor handle 3*a* in such a normal position of the door lock is rotatable by a user. In such a case, the handle 3*a* directly rotates the actuating shaft 17 to operate the latch bolt 1.

In such a tubular-type door lock, the unlocking device is operated as follows. When the locking lever 30, provided on the indoor handle 3*a*, is rotated counterclockwise at an angle of about 90°, the door lock is locked so that the outdoor handle 3 cannot be operated if a user does not use a key. That is, when the locking lever 30 is rotated counterclockwise, the locking shaft 15 is rotated in the same direction so that the slope surfaces 16*b* of the locking ratchet 16 slide on the slope surfaces 18*b* of the unlocking ratchet 18. Therefore, the locking ratchet 16 is further inserted into the hollow shaft 6 along with the locking shaft 15. In such a case, the top surfaces 16*a* of the locking ratchet 16 are finally brought into contact with the top surfaces 18*a* of the unlocking ratchet 18, respectively.

Since the ratchet 16 moves into the shaft 6 along with the actuating sleeve 10, the first locking projections 11 of the sleeve 10 move from the opening 26 into the locking slots 25 of the outdoor plate 2. Both the hollow shaft 6 and the actuating sleeve 10 are thus commonly stopped by the locking slots 25 of the outdoor plate 2. Therefore, the outdoor handle 3 cannot be operated so that it is impossible to unlock the door lock if a user does not use a key. Such a locked position of the door lock is shown in FIGS. 3*b*, 5*a* and 5*b* in detail.

In the locked position of the door lock, the second locking projections 12 of the sleeve 10 are removed from the horizontal locking slots 24 of the unlocking ratchet 18, thus allowing the unlocking ratchet 18, integrated with the actuating shaft 17, to be freely rotatable without being interfered with by the outdoor handle 3 or the parts concerned with said handle 3. In the locked position, the indoor handle 3*a* can be operated by a user without using a key. Due to the device of this invention, it is possible to open the door while automatically unlocking the door lock by only rotating the indoor handle 3*a* without separately unlocking the locking lever 30. Such an operation of the device will be described hereinbelow in more detail.

When the indoor handle 3*a* in the locked position of the locking lever 30 is rotated counterclockwise, the handle 3*a* rotates the actuating shaft 17 in the same direction. The unlocking ratchet 18 is thus rotated counterclockwise along with the locking ratchet 16. In such a case, the locking ratchet 16 has been rotated counterclockwise from its initial position to another position angularly spaced apart from said initial position at an angle of 90°. Therefore, the locking ratchet 16 is biased by the actuating spring 14 in a direction toward the outdoor plate 2, so that the two ratchets 16 and 18 engage with each other after rotating counterclockwise at an angle of 90° as shown in FIGS. 6*a* and 6*b*.

Figures 6A, 6B, 7A, 7B:
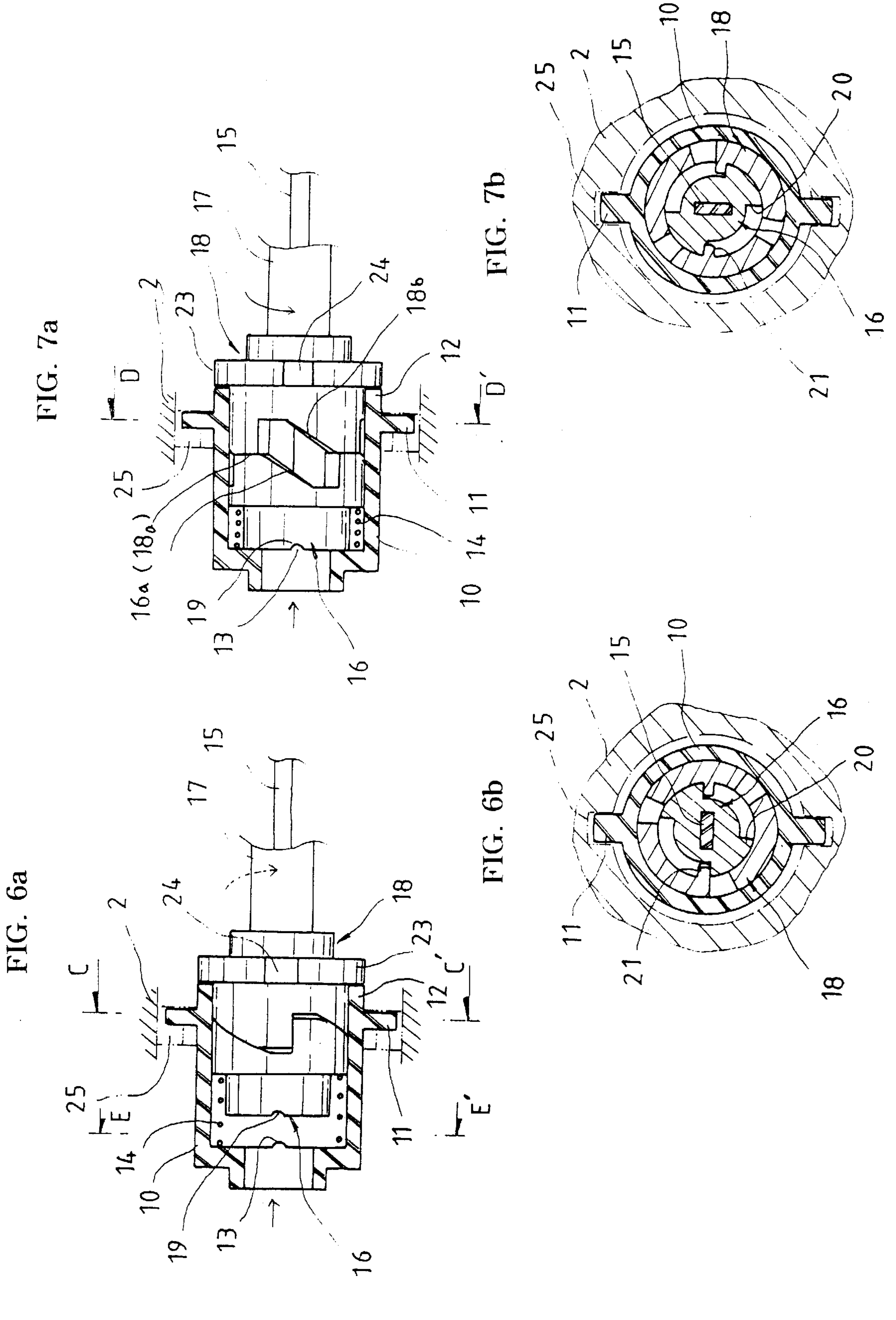

As shown in FIGS. 6*a* and 6*b*, even when the unlocking ratchet 18 is moved in the direction toward the outdoor plate 2 by the spring 14 as described above, the second locking projections 12 of the sleeve 10 do not engage with the horizontal locking slots 24 of the unlocking ratchet 18. The sleeve 10 is thus kept in a locked position. However, the above sleeve 10 is completely released from such a locked position when the indoor handle 3*a* is rotated clockwise at an angle of 90° and completely returns to its original position. When the indoor handle 3*a* completely returns to its original position, both ratchets 16 and 18 return to their normal positions of FIGS. 4*a* and 4*b*. When the unlocking ratchet 18 returns to its normal position and allows its horizontal locking slots 24 to return to their normal positions, the second locking projection 12 of the sleeve 10 engage with the locking slots 24 of the unlocking ratchet 18. The first locking projections 11 of the sleeve 10 thus elastically move from the locking slots 25 into the opening 26 of the outdoor plate 2 by the restoring force of the spring 9.

Therefore, the door lock of this invention is completely released from such a locked position when the indoor handle 3*a* elastically returns to its original position after being rotated counterclockwise at an angle of 90°. When the door lock is in the unlocked position, the latch bolt 1 is operable by rotating the actuating shaft 17 of the unlocking ratchet 18 counterclockwise at an angle of 90°.

When the indoor handle 3*a* in the locked position of the locking lever 30 is rotated clockwise at an angle of 90° prior to elastically returning to its original position to unlock the door lock, the device of this invention is operated as follows.

In the locked position as shown in FIGS. 3*b*, 5*a* and 5*b*, the stop projections 20 of the locking ratchet 16 are brought into contact with the stop rails 21 of the unlocking ratchet 18 as shown in FIG. 5*b*. In such a case, the top surfaces 16*a* of the locking ratchet 16 come into contact with the top surfaces 18*a* of the unlocking ratchet 18. Therefore, the two ratchets 16 and 18 are not rotatable relative to each other.

When the indoor handle 3*a* in such a case is rotated clockwise at an angle of 90°, the unlocking ratchet 18, with the actuating shaft 17, is rotated in the same direction along with the locking ratchet 16. Therefore, the top surfaces 16*a* and 18*a* of the two ratchets 16 and 18 are rotated clockwise at an angle of 90° while coming into contact with each other. The locking ratchet 16 returns to its normal position, while the unlocking ratchet 18 reaches a position rotated clockwise at an angle of 90° from its normal position.

Such an operation is shown in FIGS. 7*a* and 7*b* in detail. As shown in the drawings, since the locking ratchet 16 is primarily rotated at an angle of 90°, the two ratchet locking ribs 13 of the sleeve 10 are removed from a first pair of ratchet locking grooves 19 of said ratchet 16 and newly engage with a second pair of ratchet locking grooves 19. In such a case, the top surfaces 16*a* and 18*a* of the two ratchets 16 and 18 are continuously brought into contact with each other, while the sleeve 10 is kept locked.

However, when the indoor handle 3*a* is rotated counterclockwise at an angle of 90°, thus returning from the above-mentioned position to its original position, the door lock is unlocked as follows. That is, when the indoor handle 3*a* returns to its original position as described above, the unlocking ratchet 18 returns to its normal position, while the locking ratchet 16 is stopped. The slope surfaces 16*b* and 18*b* of both ratchets 16 and 18 thus relatively slide on each other, while the locking ratchet 16 is moved in a direction toward the outdoor plate 2 by the actuating spring 14. Therefore, the two ratchets 16 and 18 are finally brought into engagement with each other as shown in FIGS. 3*a* and 4*a*. When the unlocking ratchet 18 completely returns to its normal position, the horizontal locking slots 24 of said ratchet 18 are brought into engagement with the second locking projections 12 of the sleeve 10. In such a case, the sleeve 10 elastically moves toward the indoor handle by the restoring force of the spring 9. The first locking projections 11 of the sleeve 10 thus move from the locking slots 25 into the opening 26 of the outdoor plate 2. The door lock is thus completely unlocked.

In such a case, it is possible to operate the latch bolt 1 by rotating the actuating shaft 17 of the unlocking ratchet 18 clockwise at an angle of 90°.

In a brief description, the locking ratchet 16 elastically moves outwardly when the indoor handle 3*a* in a locked position of the door lock is rotated counterclockwise. However, when the handle 3*a* returns to its original position, the locking ratchet 16 returns to its normal position while allowing the sleeve 10 to move toward the indoor handle. The door lock is thus unlocked. However, when the handle 3*a* in the locked position is rotated clockwise, the locking ratchet 16 is primarily rotated to its normal position. Thereafter, both the locking ratchet 16 and the sleeve 10 move outwardly in a direction to the right in the drawings when the handle 3*a* returns to its original position. The door lock is thus unlocked. That is, the device of this invention allows the door lock to be unlocked when the indoor handle 3*a* is rotated in either direction.

As described above, the present invention provides a device for unlocking a tubular-type door lock in conjunction with the indoor handle of the lock. The device quickly and simultaneously performs both a door latch opening action and an unlocking action in conjunction with a rotating motion of the indoor handle, thus allowing a user to easily and quickly open a door by rotating the indoor handle without separately unlocking the locking lever. Since the device unlocks the door without failure when the indoor handle is operated by a user, the device allows users to be completely free from confirming the locked or unlocked position of the locking lever at a time they go out of a room, thus being convenient to the users.

Although the preferred embodiments of the present invention have been disclosed for illustrative purposes, those skilled in the art will appreciate that various modifications., additions and substitutions are possible, without departing from the scope and spirit of the invention as disclosed in the accompanying claims.

What is claimed is:

1. A device for unlocking a tubular-type door lock in conjunction with an indoor handle of said lock, comprising:

a holed outdoor plate coupled to an outdoor handle of the door lock, said plate having a locking slot and defining an opening at a position outside the locking slot;

a hollow shaft fitted into said holed outdoor plate;

a bearing fixedly seated in said hollow shaft at a predetermined position;

a hollow sleeve axially received in said hollow shaft to be movable in opposite directions and normally biased in a direction toward the indoor handle by a first spring located between said bearing and said sleeve, said sleeve thus being normally and rotatably positioned in said opening of the outdoor plate to be unlocked, but selectively engaging with the locking slot of the outdoor plate to be locked by the outdoor plate;

a ratchet unit received in said hollow sleeve while being normally biased in a direction toward the indoor handle, said ratchet unit being operable in conjunction with said indoor handle, thus selectively moving said sleeve from a locked position into an unlocked position, said ratchet unit comprising:

an unlocking ratchet positioned in the sleeve at a position toward the indoor handle, said unlocking ratchet having a first ratchet face including first top and bottom surfaces with a first slope surface extending between said top and bottom surfaces; and a locking ratchet positioned in the sleeve at a position toward the outdoor handle relative to said unlocking ratchet while being normally biased in the direction toward the indoor handle by a second spring located between an inside end surface of said sleeve and a flat face of said locking ratchet having a second ratchet face including second top and bottom surfaces with a second slope surface extending between said second top and bottom surfaces, said locking ratchet engaging with the unlocking ratchet at said first and second ratchet faces to be relatively slidable on said first and second slope surfaces in conjunction with movement of the indoor handle, thus being selectively movable in an axial direction to move the sleeve from the locked position into the unlocked position of the sleeve.

2. The device according to claim 1, wherein said hollow sleeve comprises:

at least one first locking projection radially and outwardly formed on an end of said sleeve nearest said indoor handle, said first locking projection being normally and rotatably positioned in said opening of the outdoor plate to unlock the sleeve, but selectively engaging with the locking slot of the outdoor plate in conjunction with the two ratchets to lock the sleeve to the outdoor plate; and two ratchet locking ribs axially and interiorly formed on a bottom wall of the sleeve and adapted for selectively engaging with a plurality of ratchet locking grooves radially formed on said flat face of said locking ratchet.

3. The device according to claim 1, wherein said locking ratchet has four angularly and regularly spaced locking grooves on said flat face and two stop projections perpendicular to said second ratchet face, said locking grooves selectively engaging with two ratchet locking ribs axially and interiorly formed on a bottom wall of said sleeve; and said unlocking ratchet has two stop rails axially formed on an interior wall and engages with the stop projections of said locking ratchet at said stop rails, said unlocking ratchet also having an annular hoop on an exterior wall, said hoop being notched at a position to form a horizontal locking slot engaging with a second locking projection axially extending from said end of said sleeve nearest said indoor handle at a same position along a circumference of said sleeve as the first locking projection.

4. A device for unlocking a tubular-type door lock in conjunction with an indoor handle of said lock, comprising:

a holed outdoor plate coupled to an outdoor handle of the door lock, said plate having a locking slot and defining an opening at a position outside the locking slot;

a hollow shaft fitted into said holed outdoor plate;

a bearing fixedly seated in said hollow shaft at a predetermined position;

a hollow sleeve axially received in said hollow shaft to be movable in opposite directions and normally biased in a direction toward the indoor handle by a first spring located between said bearing and said sleeve, said sleeve thus being normally and rotatably positioned in said opening of the outdoor plate to be unlocked, said sleeve having a first locking projection radially and outwardly formed on an end of said sleeve nearest said indoor handle, said first locking projection being normally and rotatably positioned in said opening of the outdoor plate to unlock the sleeve and selectively engaging with the locking slot of the outdoor plate to lock the sleeve to the outdoor plate, and a second locking projection axially extending from said end of said sleeve nearest said indoor handle at a same position along a circumference of said sleeve as the first locking projection;

a ratchet unit received in said hollow sleeve and normally biased in a direction toward said indoor handle, said ratchet unit being operable in conjunction with said indoor handle and said first locking projection to selectively move said sleeve from a locked position into an unlocked position, said ratchet unit including:

an unlocking ratchet positioned in the sleeve and having a first ratchet face including first top and bottom surfaces with a first slope surface extending between said top and bottom surfaces, said unlocking ratchet further having an annular hoop on an exterior wall, said hoop being notched at a position to form a horizontal locking slot engaging with said second locking projection; and a locking ratchet positioned in the sleeve between said unlocking ratchet and an end of said sleeve nearest said outdoor handle, said locking ratchet normally biased in the direction toward the indoor handle by a second spring located between the end of said sleeve nearest said outdoor handle and a flat face of said locking ratchet, said locking ratchet further having a second ratchet face including second top and bottom surfaces with a second slope surface extending between said second top and bottom surfaces, said locking ratchet engaging with the unlocking ratchet at said first and second ratchet faces to be relatively slidable on said first and second slope surfaces in conjunction with movement of the indoor handle, thus being selectively movable in an axial direction to move the sleeve from the locked position into the unlocked position of the sleeve.

5. The device according to claim 4, wherein said hollow sleeve further comprises:

two ratchet locking ribs axially and interiorly formed on a bottom wall of the sleeve and adapted for selectively engaging with a plurality of ratchet locking grooves radially formed on said flat face of said locking ratchet.

6. The device according to claim 4, wherein said locking ratchet has four angularly and regularly spaced locking grooves on said flat face and two stop projections perpendicular to said second ratchet face, said locking grooves selectively engaging with two ratchet locking ribs axially and interiorly formed on a bottom wall of said sleeve; and said unlocking ratchet has two stop rails axially formed on an interior wall and engages with the stop projections of said locking ratchet at said stop rails.

* * * * *